United States Patent [19]

Ruscigno

[11] 4,161,797
[45] Jul. 24, 1979

[54] DETONATOR ASSEMBLY

[76] Inventor: Harry G. Ruscigno, P. O. Box 164, Orange, Calif. 92669

[21] Appl. No.: 667,187

[22] Filed: Mar. 15, 1976

[51] Int. Cl.² .......................... B63C 9/16; B63C 9/24
[52] U.S. Cl. .................................. 9/316; 137/543.17; 222/5
[58] Field of Search ........................ 9/316, 319; 222/5; 280/737; 137/543.17, 543.21

[56] References Cited

U.S. PATENT DOCUMENTS

| 1,801,082 | 4/1931 | Hobart | 137/543.17 X |
| 2,040,616 | 5/1936 | Mapes | 222/5 X |
| 2,378,924 | 6/1945 | Honegger et al. | 9/319 X |
| 2,655,936 | 10/1953 | Wexler et al. | 137/543.17 |
| 2,722,342 | 11/1955 | Fox | 222/5 |
| 2,919,833 | 1/1960 | Wolshin | 222/5 |
| 3,077,288 | 2/1963 | Henry | 9/316 X |
| 3,457,949 | 7/1969 | Coulter | 137/543.21 |
| 3,490,648 | 1/1970 | Fujimoto | 222/5 |
| 3,547,165 | 12/1970 | Butterworth | 222/5 X |
| 3,809,288 | 4/1974 | Mackal | 9/316 X |

FOREIGN PATENT DOCUMENTS 705063  3/1954  United Kingdom ................ 137/543.21

Primary Examiner—David H. Brown
Attorney, Agent, or Firm—Philip M. Hinderstein

[57] ABSTRACT

A detonator assembly for mating a gas cartridge to an expandable chamber, such as a life vest, the cartridge having a sealing diaphragm across one end thereof and the chamber having a wall, comprising a body having a threaded collar on one side thereof which is adapted to extend through a hole in the chamber wall, the body having first and second intersecting passageways therein, the first passageway extending through the collar, one end of the second passageway being threaded to receive the one end of the cartridge; a nut positionable in the chamber for engaging the collar and connecting the body to the chamber wall with the first passageway providing a flow path into the chamber; a firing pin positioned for axial movement in the second passageway and having a diaphragm puncturing element at one end thereof positioned in facing relationship with the one end of the cartridge; a spring positioned within the body and surrounding the firing pin for biasing the firing pin with the diaphragm puncturing element spaced from the cartridge sealing diaphragm; a manually operable lever for moving the firing pin axially to puncture the cartridge diaphragm; and a one-way valve positioned within the first passageway for permitting gas flow from the cartridge to the chamber via the first and second passageways and preventing escape of the gas from the chamber.

5 Claims, 3 Drawing Figures

U.S. Patent     Jul. 24, 1979     4,161,797
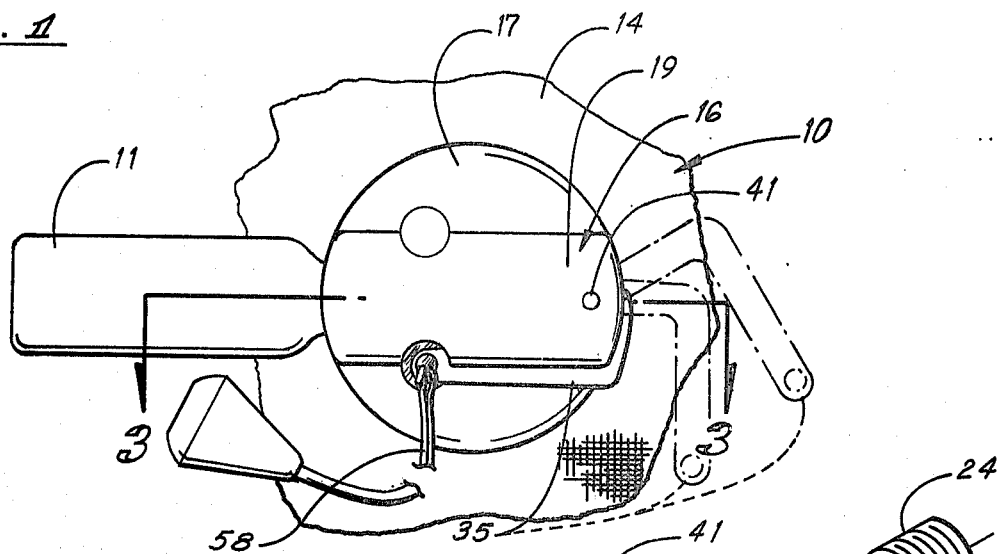
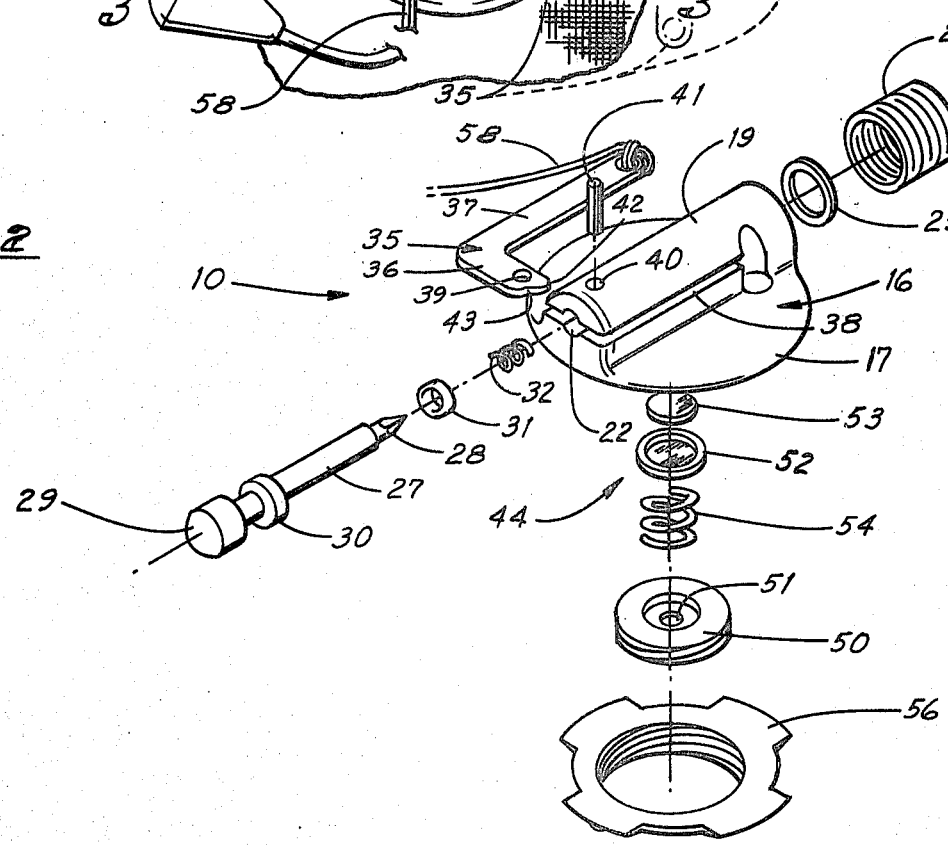
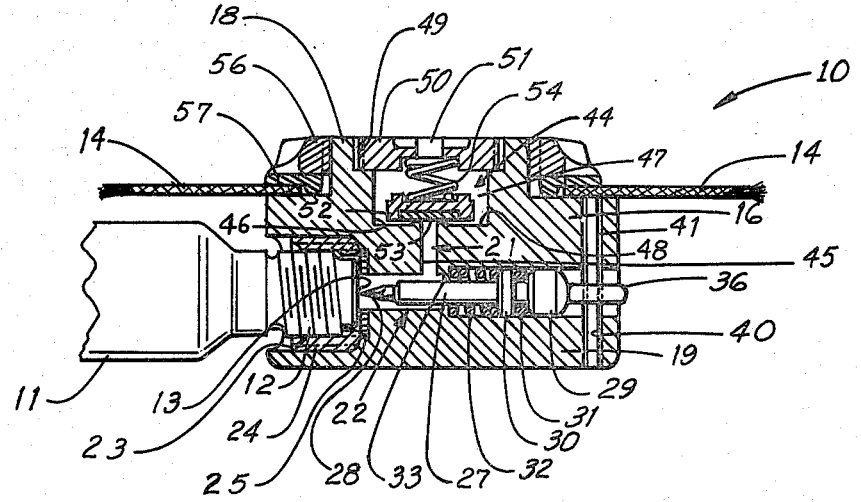

DETONATOR ASSEMBLY

BACKGROUND OF THE INVENTION

1. Field of the Invention

The present invention relates to a detonator assembly and, more particularly, to a totally self-contained detonator assembly for mating a gas cartridge to an expandable chamber.

2. Description of the Prior Art

Detonator assemblies for mating a gas cartridge, such as a $CO_2$ cartridge, to an expandable chamber, such as a Mae West, life vest, a raft, or the like, are known to those skilled in the art. The gas cartridge contains $CO_2$ under pressure and a thin sealing diaphragm at one end thereof, at the end of a threaded neck. The detonator contains a firing pin having a diaphragm puncturing element which is held in spaced relationship relative to the cartridge diaphragm and a manually operable lever can be used to move the firing pin towards the diaphragm to puncture same.

Once the diaphragm is punctured permitting escape of the gas from the cartridge, a manifold has normally been required for conducting the gas into the chamber and for preventing its subsequent escape. A typical manifold device includes a one-way valve of the type commonly used on automobile tires including a pin which may be depressed to permit flow of gas into the chamber and which automatically retracts to prevent escape of the gas from the chamber. Typical detonators include means for mating the detonator assembly to the tire-type manifold valve.

A number of problems exist with regard to detonator assemblies and manifolds of the above type. Typical valves have been designed for use with automobile tires where accuracy and reliability of operation have not been overriding considerations. In other words, if a tire valve used on a tire is found to be inoperative, it is a simple matter to replace it. However, when using such a tire valve with a life saving device such as a life vest or a life raft, it is not acceptable that the valve will not function and this has occurred on numerous occasions.

Secondly, such a device is not suitable for use in an underwater environment, such as for a life vest used by a scubba diver. That is, the tire valves and the detonator assemblies are made of anodized aluminum, brass, and carbon steel and when used in a water environment, the aluminum and steel act as electrodes, causing an electron flow therebetween. The result is rapid galvanic corrosion which renders the valve inoperable after a short period of exposure to the water environment. Accordingly, no suitable solution to the provision of a detonator assembly for use in a water environment presently exists.

SUMMARY OF THE INVENTION

According to the present invention, there is provided a totally self-contained detonator assembly which functions both as a detonator assembly and as a manifold for mating a gas cartridge to an expandable chamber. The present detonator assembly completely eliminates the necessity for using conventional tire valves and eliminates all aluminum and brass parts. The present detonator assembly is made entirely from plastic, rubber, and stainless steel and does not, therefore, corrode when used in a water environment. The design of the present detonator assembly makes it readily attachable to any wall of an expandable chamber without the necessity of attaching a valve thereto. Thus, the present valve is readily usable in the field to mate a gas cartridge to a chamber. The present detonator assembly is highly reliable in use and is adapted for use with Mae Wests, life vests and the like.

Briefly, the present detonator assembly for mating a gas cartridge to an expandable chamber comprises a body having a threaded collar on one side thereof which is adapted to extend through a hole in a chamber wall, the body having first and second intersecting passageways therein, the first passageway extending through the collar, one end of the second passageway being internally threaded to receive the threaded neck of the cartridge; a nut extendable through the hole in the chamber wall for engaging the collar on the inside of the chamber and connecting the body to the chamber wall with the first passageway providing a flow path into the chamber from the second passagwway; a firing pin positioned for axial movement in the second passageway and having a diaphragm puncturing element at one end thereof which is biased in facing, spaced relationship to the cartridge diaphragm; a manually operable lever for moving the firing pin axially to puncture the cartridge diaphragm; and a one-way valve positioned within the first passageway for permitting gas flow from the cartridge to the chamber and preventing escape of the gas from the chamber thereafter.

OBJECTS

It is therefore an object of the present invention to provide a detonator assembly.

It is a further object of the present invention to provide a totally self-contained detonator assembly for mating a gas cartridge to an expandable chamber.

It is a still further object of the present invention to provide a detonator assembly usable in a water environment.

It is another object of the present invention to provide a detonator assembly which is highly reliable in use.

It is still another object of the present invention to provide a detonator assembly which does not use tire valves and is not subject to corrosion in use.

Still other objects, features, and attendant advantages of the present invention will become apparent to those skilled in the art from a reading of the following detailed description of the preferred embodiment constructed in accordance therewith, taken in conjunction with the accompanying drawings wherein like numerals designate like parts in the several figures and wherein:

BRIEF DESCRIPTION OF THE DRAWINGS

FIG. 1 is a front elevation view of a detonator assembly constructed in accordance with the teachings of the present invention shown in position mating a gas cartridge to the wall of an expandable chamber;

FIG. 2 is an exploded perspective view of the detonator assembly of FIG. 1; and

FIG. 3 is a sectional view taken along the line 3—3 in FIG. 1.

DESCRIPTION OF THE PREFERRED EMBODIMENT

Referring now to the drawings, there is shown a detonator assembly, generally designated 10, for mating a standard gas cartridge 11 to an expandable chamber. Gas cartridge 11 is of a type well known to those skilled in the art including a threaded neck 12 and a sealing diaphragm 13 across one end thereof, at the end of neck 12. The chamber is defined by a wall 14.

Assembly 10 includes a one piece body 16 which is typically made from a hard plastic material. Body 16 has a planar flange 17 and an externally threaded collar 18 extending perpendicularly from one side of flange 17. Made integral with the other side of flange 17 is a semi-cylindrical section 19 which extends perpendicular to collar 18. Body 16 has first and second passageways, generally designated 21 and 22, respectively, therein. As seen most clearly in FIG. 3, passagway 22 extends entirely through section 19 of body 16, parallel thereto, whereas passageway 21 extends partially through body 16, through collar 18, parallel thereto, and terminates internally of body 16, at passageway 22. One end of passageway 22 is enlarged, at 23, and is internally threaded to receive the external threads of a plastic sleeve 24 which is also internally threaded. Sleeve 24 is adapted to receive the external threads of neck 12 of cartridge 11 so as to position diaphragm 13 perpendicular to the axis of passageway 22. The use of sleeve 24, rather than simply having cartridge 11 engage threads 23 in body 16 permits sleeve 24 to be replaced in the event the internal threads thereof become worn. Sleeve 24 also permits a rubber gasket 25 to be positioned within passageway 22, gasket 25 being held therein by sleeve 24. In this manner, when cartridge 11 is mated to detonator assembly 10, the end of neck 12 engages gasket 25, providing a fluid-tight seal between cartridge 11 and passageway 22.

Positioned within the remainder of passageway 22 is a firing pin 27 having a diaphragm puncturing element 28 at one end thereof, an enlarged head 29 at the other end thereof, and a collar 30 intermediate the ends thereof. Firing pin 27 may be made from stainless steel or any other suitable non-corrosive material. A rubber O-ring 31 is adapted to be positioned between head 29 and collar 30 to provide a fluid-tight seal between the perimeter of firing pin 27 and the walls of passageway 22. A stainless steel spring 32 is adapted to surround firing pin 27 and be positioned between collar 30 and an internal abutment 33 surrounding passageway 22. In this manner, firing pin 27 is axially movable in passageway 22 but has diaphragm puncturing element 28 biased in spaced relationship to diaphragm 13 of cartridge 11.

Firing pin 27 is activated in a manner known to those skilled in the art. That is, detonator assembly 10 includes a conventional L-shaped operating lever 35 having arms 36 and 37. Section 19 of body 16 has a U-shaped slot 38 extending therearound for receipt of arms 36 and 37 of lever 35. The end of arm 36 of lever 35 has a hole 39 therein and body 16 has a hole 40 extending entirely therethrough, perpendicular to section 19, at one end thereof, parallel to collar 18. Lever 35 may be positioned on either side of body 16, i.e. it is reversible, with hole 39 therein aligned with hole 40 in body 16. A pin 41 is extendable through holes 39 and 40 in arm 36 and body 16, respectively, to pivotably connect lever 35 to body 16.

Detonator assembly 10 further includes a one-way valve, generally designated 44, positioned within passageway 21. More specifically, passageway 21 has a first diameter section 45 which intersects passageway 22 and an increased diameter section 46 in collar 18 so as to define an open ended cavity 47 having a base 48. The outer end of passageway section 46 is internally threaded, at 49, to receive the external threads of a plastic retainer disc 50 having a central hole 51 extending therethrough. Valve 44 includes a plastic pressure plate or disc 52 having recesses on opposite sides thereof. The recess on one side of disc 52 is adapted to receive a disc-shaped rubber gasket 53 which is adapted to contact base 48 of cavity 47. The recess on the other side of disc 52 is adapted to receive one end of a stainless steel spring 54, the other end of which is positioned within a recess in the back side of retainer disc 50.

In order to connect body 16 to wall 14, a hole is required in wall 14, such hole having a diameter greater than the outside diameter of collar 18 and a diameter less than the outside diameter of flange 17 of body 16. As shown most clearly in FIG. 3, collar 18 is extendable through the hole in wall 14 with flange 17 engaging one side of wall 14. Detonator assembly 10 includes an internally threaded nut 56 which may be extended through the hole in wall 14 and which is adapted to engage collar 18 and the other side of wall 14 so as to sandwich wall 14 between flange 17 and nut 56. A washer 57 may be electronically welded to wall 14, surrounding the hole therein, so as to provide a fluid-tight arrangement when nut 56 is connected to body 16.

OPERATION

Considering first the assembly of detonator assembly 10, the separate parts thereof are shown in a disassembled configuration in FIG. 2. Gasket 25 is inserted into end 23 of passageway 22 and is held firmly in position therein upon insertion of sleeve 24 into end 23. O-ring 31 and spring 32 are positioned around firing pin 27 and firing pin 27 is positioned within passageway 22. Lever 35 is positioned on one side or the other of section 19 of body 16 with hole 39 in arm 36 aligned with hole 40 in body 16. As seen in FIG. 3, arm 36 engages head 29 of firing pin 27 to prevent removal of firing pin 27 from body 16. Furthermore, pin 41, after being extended through hole 40, prevents removal of lever 35 from body 16.

Gasket 53 is placed in its recess in pressure plate 52 and plate 52, gasket 53, and spring 54 are positioned within cavity 47. Retainer disc 50 is then screwed into section 46 of passageway 21, preventing removal of elements 52-54 from cavity 47.

In order to attach detonator assembly 10 to an expandable chamber having a wall 14, wall 14 is manipulated to extend nut 56 through the hole therein. Since wall 14 is typically made of a flexible material, nut 56 may be readily extended through a hole therein even though nut 56 has a larger diameter than such hole. In a factory installation, washer 57 would be connected to wall 14, surrounding the hole therein, to provide a good seal. In a field use, a gasket or washer would be positioned on opposite sides of wall 14 to effect such seal. In any event, by rotating body 16 relative to nut 56, detonator assembly 10 is tightly connected to wall 14, permitting fluid communication from the chamber in wall 14 through hole 51 in disc 50 into cavity 47 in body 16. Cartridge 11 may now be connected to detonator assembly 10 by screwing neck 12 into sleeve 24.

FIG. 1 shows detonator assembly 10 in position ready for use. A cord 58 may be connected to the free end of arm 37 of lever 35 for manually moving firing pin 27. By pulling on cord 58, lever 35 may be moved through an angle of 90° to one of the positions shown in phantom in FIG. 1 whereupon arm 36 pivots about pin 41. Surface 42, at the end of arm 36, pivots inwardly, contacting head 29 of firing pin 27 and moving firing pin 27 axially towards cartridge 11. Diaphragm puncturing element 28 extends into diaphragm 13, puncturing same, and permitting release of the gas therein. Lever 35 typically has an over-center action whereupon reaching the end of surface 42 of arm 36, lever 35 moves through an additional angle of approximately 60° to the second position shown in phantom in FIG. 1. This permits head 29 of firing pin 27 to retract against surface 43 at the end of arm 36 and retraction of diaphragm puncturing element 28 from diaphragm 13.

The gas escaping from cartridge 11 is directed via passageway 22 and section 45 of passageway 21 against gasket 53. The pressure of the escaping gas is sufficient to cause compression of spring 54, thereby moving pressure plate 52 and gasket 53 away from base 48 of cavity 47 and permitting the flow of gas therearound and out through hole 51 in retainer disc 50 into the chamber to be expanded. As soon as the pressure within the chamber equals the remaining pressure in cartridge 11, spring 54 re-seats pressure plate 52 and gasket 53 against base 48 of cavity 47, preventing escape of the gas from within the chamber.

It can therefore be seen that according to the present invention, there is provided a totally self-contained detonator assembly 10 which functions both as a detonator and as a manifold for mating a gas cartridge 11 to an expandable chamber. Detonator assembly 10 completely eliminates the necessity of using conventional tire valves and eliminates all aluminum and brass parts. Detonator assembly 10 is made entirely of plastic, rubber, and stainless steel and does not, therefore, corrode when used in a water environment. The design of detonator assembly 10 makes it readily attachable to any hole of an expandable chamber without the necessity of attaching a valve thereto. Thus, assembly 10 is readily usable in the field to mate a gas cartridge to a chamber. Assembly 10 is highly reliable in use and is adapted for use with Mae Wests, life vests, and the like.

While the invention has been described with respect to the preferred physical embodiment constructed in accordance therewith, it will be apparent to those skilled in the art that various modifications and improvements may be made without departing from the scope and spirit of the invention. Accordingly, it is to be understood that the invention is not to be limited by the specific illustrative embodiment, but only by the scope of the appended claims.

I claim:

1. In a detonator assembly for mating a gas cartridge to an expandable chamber, said cartridge having a sealing diaphragm across one end thereof and said chamber having a wall, said detonator assembly being of the type including a body having first and second intersecting passageways therein, one end of said second passageway being adapted to receive said one end of said cartridge, a firing pin positioned for axial movement in said second passageway and having a diaphragm puncturing element at one end thereof positioned in facing relationship with said one end of said cartridge, means positioned within said body for biasing said firing pin with said one end thereof spaced from said one end of said cartridge, and manually operable means for moving said firing pin axially to puncture said sealing diaphragm of said cartridge, the improvement wherein:

said body has a planar flange on one side thereof and a threaded collar extending perpendicularly from one side of said flange, said collar being adapted to extend through a hole in said chamber wall, said first passageway extending through said collar for providing a fluid passageway into said chamber;

a nut positionable in said chamber for engaging said collar and sandwiching said chamber wall between said nut and said flange to connect said body to said chamber wall and to provide a fluid-tight seal between said chamber and said first passageway in said body; and one-way valve means positioned within said first passageway in said body for permitting flow of the gas in said cartridge from said cartridge to said chamber via said first and second passageways and preventing escape of said gas from said chamber.

2. In a detonator assembly according to claim 1, the improvement wherein said body, said flange, and said collar are formed as a one-piece article from a single piece of material.

3. In a detonator assembly according to claim 1, the improvement wherein said first passageway has an enlarged section in said collar so as to define an open-ended cavity, having a base, for said one-way valve means, the remainder of said first passageway extending from said base to said second passageway, and wherein said valve means comprises:

a valve element positioned in said cavity and being adapted to contact said base thereof to prevent gas flow through said first passageway; and means for biasing said valve element in contact with said cavity base, said biasing means being compressible to permit gas flow from said cartridge to said chamber via said first passageway.

4. In a detonator assembly according to claim 3, the improvement wherein said valve element comprises a disc positioned parallel to said cavity base and said biasing means comprises a spring.

5. In a detonator assembly according to claim 4, the improvement wherein said cavity is internally threaded at the open end thereof and further comprising:

a removable plate being externally threaded to engage the threads in said cavity, said spring extending between said disc and said plate, said plate having a hole therein to permit gas flow therethrough.

* * * * *